United States Patent
Kohno et al.

(10) Patent No.: US 7,067,605 B2
(45) Date of Patent: Jun. 27, 2006

(54) ORGANIC POLYMER HAVING EPOXY-AND/OR OXETANYL-CONTAINING SILICON GROUP AT THE END AND PROCESS FOR PRODUCING THE SAME

(75) Inventors: Yoshiyuki Kohno, Akashi (JP); Hidetoshi Odaka, Kobe (JP); Hiroshi Ando, Akashi (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 10/509,623

(22) PCT Filed: Apr. 8, 2003

(86) PCT No.: PCT/JP03/04460

§ 371 (c)(1),
(2), (4) Date: Sep. 29, 2004

(87) PCT Pub. No.: WO03/085024

PCT Pub. Date: Oct. 16, 2003

(65) Prior Publication Data

US 2005/0228159 A1 Oct. 13, 2005

(30) Foreign Application Priority Data

Apr. 8, 2002 (JP) .............................. 2002-105242

(51) Int. Cl.
*C08G 77/14* (2006.01)
(52) U.S. Cl. .............................. 528/27; 528/31; 528/25; 525/106; 525/105
(58) Field of Classification Search ................. 528/31, 528/25, 27; 525/106, 105
See application file for complete search history.

(56) References Cited

U.S. PATENT DOCUMENTS

| | | | | |
|---|---|---|---|---|
| 5,240,971 | A | * | 8/1993 | Eckberg et al. ............... 522/31 |
| 5,721,020 | A | * | 2/1998 | Takami et al. ............... 427/508 |
| 5,883,214 | A | | 3/1999 | Wipfelder et al. |
| 6,506,868 | B1 | * | 1/2003 | Goda et al. .................... 528/27 |

FOREIGN PATENT DOCUMENTS

| | | |
|---|---|---|
| EP | 0 131 745 A2 | 1/1985 |
| EP | 0 214 696 A | 3/1987 |
| EP | 578462 A2 | 1/1994 |
| EP | 816461 A2 | 1/1998 |
| EP | 0 949 296 A1 | 10/1999 |
| JP | 5-262960 A | 10/1993 |
| JP | 6-240001 A | 8/1994 |
| JP | 8-165389 A | 6/1996 |
| JP | 10-212343 A | 8/1998 |
| JP | 10-231351 A | 9/1998 |
| JP | 2000-344863 A | 12/2000 |
| JP | 2001-279058 A | 10/2001 |
| WO | 01/05862 * | 1/2001 |
| WO | 01/30930 * | 5/2001 |

OTHER PUBLICATIONS abstract WO 01/05862, Jan. 2001.*

* cited by examiner

*Primary Examiner*—Margaret G. Moore
(74) *Attorney, Agent, or Firm*—Sughrue Mion, PLLC

(57) ABSTRACT

An organic polymer is provided which has an end structure expressed by general formula (1):

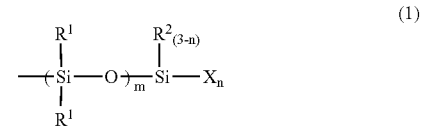

In the formula, $R^1$ represents an alkyl group having a carbon number in the range of 1 to 20, an aryl group having a carbon number in the range of 6 to 20, an aralkyl group having a carbon number in the range of 7 to 20, or a triorganosiloxy group expressed by $(R')_3SiO—$. $R^2$ represents an alkyl group having a carbon number in the range of 1 to 20, an aryl group having a carbon number in the range of 6 to 20, an aralkyl group having a carbon number in the range of 7 to 20, an alkoxy group having a carbon number in the range of 1 to 20, or a triorganosiloxy group expressed by $(R')_3SiO—$. X represents a monovalent organic group having an epoxy group and/or an oxetanyl group. m represents an integer in the range of 0 to 20. n represents an integer of 1, 2, or 3.

10 Claims, No Drawings

ORGANIC POLYMER HAVING EPOXY-AND/OR OXETANYL-CONTAINING SILICON GROUP AT THE END AND PROCESS FOR PRODUCING THE SAME

TECHNICAL FIELD

The present invention relates to structurally novel polymers having epoxy- and/or oxetanyl-containing silicon groups at their ends, and to a process for producing the same.

BACKGROUND ART

Since epoxy groups have superior reactivity, various types of epoxy group-containing polymers, which are prepared by introducing epoxy groups into various types of polymer, have been developed. In the process of epoxidizing an olefin with a peroxide or the like to introduce an epoxy group, however, the resulting polymer is negatively affected by oxidation, and it is disadvantageously difficult to selectively introduce an epoxy group into the end of a polymer and to make it polyfunctional. Moreover, in some production processes, byproducts must be removed. In particular, a process disclosed in Japanese Unexamined Patent Application Publication No. 3-56505, which is a technique of the foregoing processes, and the structure of the resulting epoxy group-containing polymers may cause oxidation degradation as mentioned above, or cause an adverse effect to reactivity due to the steric hindrance around the epoxy group of the resulting polymer. Thus, epoxy group-containing polymers produced by such known processes do not necessarily have satisfactory physical properties for various applications.

It is broadly known that organic polymers each have their own characteristics. In particular, saturated hydrocarbon polymers whose main chain skeleton comprises a polymer selected from the group consisting of polyisobutylene, hydrogenated polyisoprene, hydrogenated polybutadiene, and their copolymers have high weather resistance, high heat resistance, low gas permeability, superior flexibility, and other characteristics. On the other hand, oxyalkylene polymers have superior compatibility with other polymers, flexibility, and advantageous low-temperature characteristics.

Various types of polymers have been developed which are prepared by introducing hydrolyzable groups, unsaturated groups, hydrosilyl groups, or the like into the ends of the saturated hydrocarbon polymers or the oxyalkylene polymers. However, these polymers disadvantageously require water and heating for being cured, and are also disadvantageous in storage stability.

Accordingly, polymers prepared by selectively introducing epoxy groups into the ends of various types of organic polymer have been highly demanded, and a simple production process has also been desired which prevents the polymers from deteriorating due to the introduction of the epoxy groups and which does not require purification and other steps in association with generation of byproducts.

SUMMARY OF THE INVENTION

The object of the present invention is to provide novel organic polymers having an epoxy- and/or oxetanyl-containing silicon group at their ends, prepared by selectively introducing the epoxy- and/or oxetanyl-containing silicon group into the end of various types of organic polymers, and a process for producing the organic polymers.

The inventors of the present invention have conducted intensive research to overcome the above-described disadvantages. As a result, they have found that a polymer having a specific epoxy- and/or oxetanyl-containing silicon group exhibits superior physical properties, and have accomplished the present invention.

A first invention relates to an organic polymer having at its end the structure expressed by general formula (1):

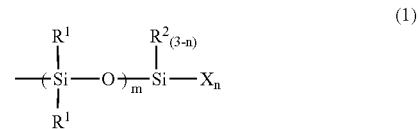

(1)

(In the formula, $R^1$ represents an alkyl group having a carbon number in the range of 1 to 20, an aryl group having a carbon number in the range of 6 to 20, an aralkyl group having a carbon number in the range of 7 to 20, or a triorganosiloxy group expressed by $(R')_3SiO$—. $R^2$ represents an alkyl group having a carbon number in the range of 1 to 20, an aryl group having a carbon number in the range of 6 to 20, an aralkyl group having a carbon number in the range of 7 to 20, an alkoxy group having a carbon number in the range of 1 to 20, or a triorganosiloxy group expressed by $(R')_3SiO$—. If the number of $R^1$s or $R^2$s is at least two, they may be the same or different. R' represents a monovalent hydrocarbon group having a carbon number in the range of 1 to 20, the three R's may be the same or different. X represents a monovalent organic group having an epoxy group and/or an oxetanyl group. If the number of X is at least two, they may be the same or different. m represents an integer in the range of 0 to 20, and n represents an integer of 1, 2, or 3.)

A second invention relates to an organic polymer having at its end the structure expressed by general formula (2):

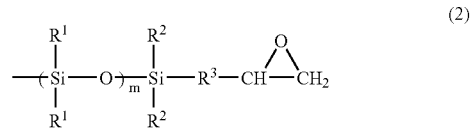

(2)

(In the formula, $R^1$, $R^2$, and m are the same as above. $R^3$ represents a divalent organic group having a carbon number in the range of 1 to 20 and containing at least one constituent atom selected from the group consisting of hydrogen, oxygen, and nitrogen.)

A third invention relates to an organic polymer having at its end the structure expressed by general formula (3):

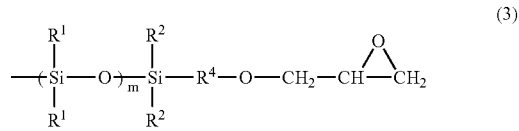

(3)

(In the formula, $R^1$, $R^2$, and m are the same as above. $R^4$ represents a divalent organic group having a carbon number in the range of 1 to 20 and containing at least one constituent atom selected from the group consisting of hydrogen, oxygen, and nitrogen.)

A fourth invention relates to an organic polymer having at its end the structure expressed by general formula (4):

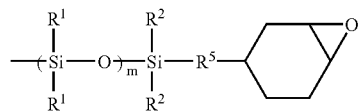
(4)

(In the formula, $R^1$, $R^2$, and m are the same as above. $R^5$ represents a divalent organic group having a carbon number in the range of 1 to 20 and containing at least one constituent atom selected from the group consisting of hydrogen, oxygen, and nitrogen.)

In the organic polymer of the first invention, preferably, at least one X has the structure expressed by the following formula:

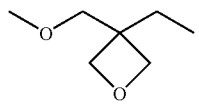

In another preferred form of the organic polymer of the first invention, at least one X has the structure expressed by the following formula:

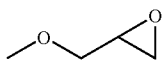

In any one of the foregoing inventions, preferably, the main chain skeleton of the organic polymer comprises a saturated hydrocarbon polymer selected from the group consisting of polyisobutylene, hydrogenated polyisoprene, hydrogenated polybutadiene, and their copolymers.

In another preferred form of any one of the foregoing inventions, the main chain skeleton of the organic polymer comprises an oxyalkylene polymer.

In further preferred form of any one of the foregoing inventions, the organic polymer is produced by an addition reaction of an organic polymer having an unsaturated group at its end with a hydrosilane compound having an epoxy group and/or an oxetanyl group. Alternatively, in any one of the foregoing inventions, the organic polymer may be produced by an exchange reaction of a hydrolyzable group between an organic polymer having a hydrolyzable silyl group at its end and a compound having at least one epoxy and/or oxetanyl group and one hydroxyl group in its molecule.

A fifth invention relates to a process for producing the organic polymer of any one of the foregoing inventions. The process performs an addition reaction of an organic polymer having an unsaturated group at its end with a hydrosilane compound having an epoxy group and/or an oxetanyl group. Another invention relates to a process for producing the organic polymer of any one of the foregoing inventions. The process performs an exchange reaction of a hydrolyzable group between an organic polymer having a hydrolyzable silyl group at its end and a compound having at least one epoxy and/or oxetanyl group and one hydroxyl group in its molecule.

The present invention will now be further described in detail.

DETAILED DISCLOSURE OF INVENTION

An organic polymer having at its end an epoxy- and/or oxetanyl-containing silicon group of the present invention can exhibit a superior curing property because of the presence of the epoxy- and/or oxetanyl-containing silicon group at the end of the molecular chain. Also, the polymer exhibits its own characteristics depending on the type of organic polymer main chain constituting the skeleton of the polymer. The main chain skeleton of the organic polymer is not particularly limited. For example, commonly known organic polymers are used, such as acrylic polymers, polyester polymers, saturated hydrocarbon polymers, and oxyalkylene polymers.

The end structure of the organic polymer of the present invention is expressed by general formula (1):

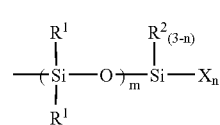
(1)

In the formula, X represents a monovalent organic group having an epoxy group and/or an oxetanyl group. X is not particularly limited as long as it is an organic group having an epoxy group and/or an oxetanyl group, and it may have a nitrogen atom, a halogen atom, or other atoms in addition to hydrogen, carbon, and oxygen atoms. X may have an organic group having an ether structure in addition to the epoxy group and/or the oxetanyl group. Preferably, X is an organic group having a carbon number in the range of 1 to 30, more preferably 1 to 20, and still more preferably 1 to 10. If the number of Xs is at least two, they may be the same or different.

$R^1$ represents an alkyl group having a carbon number in the range of 1 to 20, an aryl group having a carbon number in the range of 6 to 20, an aralkyl group having a carbon number in the range of 7 to 20, or a triorganosiloxy group expressed by $(R')_3SiO-$. $R^2$ represents an alkyl group having a carbon number in the range of 1 to 20, an aryl group having a carbon number in the range of 6 to 20, an aralkyl group having a carbon number in the range of 7 to 20, an alkoxy group having a carbon number in the range of 1 to 20, or a triorganosiloxy group expressed by $(R')_3SiO-$. Among these, preferred are alkyl groups having a carbon number in the range of 1 to 20 or the phenyl group, and more preferred are alkyl groups having a carbon number in the range of 1 to 6 and the phenyl group, from the viewpoint of reactivity and availability. m represents an integer in the range of 0 to 20, and n represents an integer of 1, 2, or 3. The epoxy group and/or the oxetanyl group may be a common epoxy and/or oxetanyl group, or a cyclic epoxy and/or oxetanyl group.

Preferably, the end structure of the organic polymer is expressed by general formula (2) from the viewpoint of reactivity of the epoxy group. More preferably, the structure is expressed by general formula (3) or (4) from the view point of ease of production, availability of raw material, and reactivity.

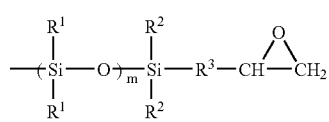
(2)

In this formula, $R^1$, $R^2$, and m are the same as above, and $R^3$ represents a divalent organic group having a carbon number in the range of 1 to 20, preferably 1 to 10, and containing at least one constituent atom selected from the group consisting of hydrogen, oxygen, and nitrogen. Specifically, $R^3$ may be a hydrocarbon group or an organic group having an ether structure.

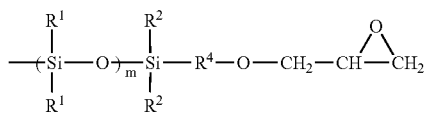
(3)

In this formula, $R^1$, $R^2$, and m are the same as above, and $R^4$ represents a divalent organic group having a carbon number in the range of 1 to 20, preferably 1 to 10, and containing at least one constituent atom selected from the group consisting of hydrogen, oxygen, and nitrogen. Specifically, $R^4$ may be a hydrocarbon group or an organic group having an ether structure.

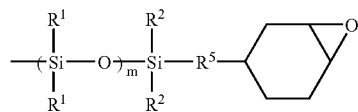
(4)

In this formula, $R^1$, $R^2$, and m are the same as above, and $R^5$ represents a divalent organic group having a carbon number in the range of 1 to 20, preferably 1 to 10, and containing at least one constituent atom selected from the group consisting of hydrogen, oxygen, and nitrogen. Specifically, $R^5$ may be a hydrocarbon group or an organic group having an ether structure.

The main chain skeleton of the organic polymer of the present invention is not limited to the above-described structure. If the main chain skeleton comprises a saturated hydrocarbon polymer selected from the group consisting of polyisobutylene, hydrogenated polyisoprene, hydrogenated polybutadiene, and their copolymers, or an oxyalkylene polymer, the cured product prepared from such an organic polymer exhibits rubber elasticity. The combined use of such an organic polymer and an epoxy resin, such as bisphenol A, gives weather resistance and flexibility to the polymer. In particular, saturated hydrocarbon polymers are also given a low gas permeability.

The saturated hydrocarbon polymers substantially contain no unsaturated carbon-carbon bond except aromatic rings, and whose examples include polyethylene, polypropylene, polyisobutylene, hydrogenated polybutadiene, and hydrogenated polyisoprene.

The polymer constituting the saturated hydrocarbon polymer main chain skeleton may be prepared by: (1) homopolymerizing or copolymerizing a component or components essentially consisting of an olefinic compound having a carbon number in the range of 1 to 6, such as ethylene, propylene, 1-butene, and isobutylene; or (2) homopolymerizing or copolymerizing a diene or dienes, such as butadiene and isoprene, or copolymerizing a diene and the above-mentioned olefinic compound and subsequently hydrogenating the copolymer. In particular, isobutylene polymers and hydrogenated polybutadiene polymers are suitable because they facilitate the introduction of functional groups into their ends, the molecular weight is easy to control, and the number of terminal functional groups can be increased. Among these, particularly preferred are isobutylene polymers. This is because isobutylene polymers are easy to handle due to their liquid feature or fluidity, and contain no unsaturated carbon-carbon bond except aromatic rings in the main chain and, accordingly, do not require to be hydrogenated. Furthermore, they have excellent weather resistance.

The isobutylene polymer may comprise monomer units consisting of isobutylene, or may further contain a monomer unit copolymerizable with isobutylene in an amount of, preferably, 50% by weight or less, more preferably 30% by weight or less, and particularly preferably 10% by weight or less.

Such monomer units include olefins having a carbon number in the range of 4 to 12, vinyl ethers, aromatic vinyl compounds, vinyl silanes, and allyl silanes. Examples of the copolymerization components include 1-butene, 2-butene, 2-methyl-1-butene, 3-methyl-1-butene, pentene, 4-methyl-1-pentene, hexene, vinylcyclohexene, methyl vinyl ether, ethyl vinyl ether, isobutyl vinyl ether, styrene, α-methylstyrene, dimethylstyrene, monochlorostyrene, dichlorostyrene, β-pinene, indene, vinyltrichlorosilane, vinylmethyldichlorosilane, vinyldimethylchlorosilane, vinyldimethylmethoxysilane, vinyltrimethylsilane, divinyldichlorosilane, divinyldimethoxysilane, divinyldimethylsilane, 1,3-divinyl-1,1,3,3-tetramethyldisiloxane, trivinylmethylsilane, tetravinylsilane, allyltrichlorosilane, allylmethyldichlorosilane, allyldimethylchlorosilane, allyldimethylmethoxysilane, allyltrimethylsilane, diallyldichlorosilane, diallyldimethoxysilane, diallyldimethylsilane, γ-methacryloyloxypropyltrimethoxysilane, and γ-methacryloyloxypropylmethyldimethoxysilane.

The hydrogenated polybutadiene polymer and other saturated hydrocarbon polymers may also contain other monomer units in addition to the main constituent monomer unit, as in the foregoing isobutylene polymer.

The saturated hydrocarbon polymer, particularly isobutylene polymer or hydrogenated polybutadiene polymer, preferably has a number average molecular weight of about 500 to 50,000. In particular, a hydrocarbon polymer having a number average molecular weight of about 1,000 to 20,000 and exhibiting a liquid feature or fluidity is more preferable from the viewpoint of ease of handling.

The main chain structure of the oxyalkylene polymer comprises repeating units expressed by —$R^6$—O—, wherein $R^6$ represents a divalent organic group having a carbon number in the range of 1 to 20. The oxyalkylene polymer may be a homopolymer, which comprises a single type of repeating unit, or a copolymer, which comprises at least two types of repeating unit. The main chain may further have a branch structure.

Examples of $R^6$ include —$CH_2CH_2$—, —$CH(CH_3)CH_2$—, —$CH(C_2H_5)CH_2$—, —$C(CH_3)_2CH_2$—, and —$CH_2CH_2CH_2CH_2$—. Among these, preferred is —$CH(CH_3)CH_2$—.

The main chain skeleton of the oxyalkylene polymer is prepared by, for example, ring-opening polymerization of monoepoxide with a starting material in the presence of a catalyst.

Exemplary starting material include dihydric alcohols, such as ethylene glycol, propylene glycol, butanediol, hexamethylene glycol, methallyl alcohol, bisphenol A, hydrogenated bisphenol A, neopentyl glycol, polybutadienediol, diethylene glycol, triethylene glycol, polyethylene glycol, polypropylene glycol, polypropylenetriol, polypropylenetetraol, dipropylene glycol, glycerin, trimethylolmethane, trimethylolpropane, and pentaerythritol; polyhydric alcohols; and oligomers having a hydroxyl group.

Examples of the monoepoxide include alkylene oxides, such as ethylene oxide, propylene oxide, α-butylene oxide, β-butylene oxide, hexene oxide, cyclohexene oxide, styrene oxide, and α-methylstyrene oxide; alkyl glycidyl ethers, such as methyl glycidyl ether, ethyl glycidyl ether, isopropyl glycidyl ether, and butyl glycidyl ether; allyl glycidyl ethers; and aryl glycidyl ethers.

The polyoxyalkylene polymer is synthesized by, for example, a polymerization in the presence of an alkaline catalyst, such as KOH, a polymerization in the presence of a transition metal compound-porphyrin complex, such as a complex obtained from a reaction between an organic aluminium compound and a porphyrin, as disclosed in Japanese Unexamined Patent Application Publication No. 61-215623, a polymerization in the presence of a compound metal cyanide complex catalyst as disclosed in, for example, Japanese Examined Patent Application Publication Nos. 46-27250 and 59-15336, a polymerization in the presence of a cesium catalyst, and a polymerization in the presence of a phosphazene catalyst. However, the synthesis of the polyoxyalkylene polymer is not particularly limited to these polymerizations. Among these, preferred is the polymerization in the presence of a compound metal cyanide complex catalyst, from the viewpoint of ease of preparation of a less colored polymer having a high molecular weight.

Alternatively, the main chain skeleton of the polyoxyalkylene polymer may be prepared by chain elongation or the like of a hydroxyl-terminated oxyalkylene polymer with a difunctional or higher functional halogenated alkyl, such as $CH_2Cl_2$ or $CH_2Br_2$, in the presence of a basic compound, such as KOH, NaOH, $KOCH_3$, or $NaOCH_3$.

The main chain skeleton of the oxyalkylene polymer may contain other components, such as urethane bond components, as long as such components do not negatively affect the characteristics of the oxyalkylene polymer.

The process for introducing the epoxy- and/or oxetanyl-containing silicon group having the structure expressed by any one of general formulas (1) to (4) into an end of an organic polymer is not particularly limited. However, preferred introduction is performed by addition of an epoxy- and/or oxetanyl-containing hydrosilane compound to an unsaturated group, or hydrolyzable group exchange reaction between an organic polymer having a hydrolyzable silyl group at its end and a compound having at least one epoxy group and/or oxetanyl group and one hydroxyl group in its molecule because these processes do not cause degradation resulting from oxidation in the introduction nor require purification by, for example, deoxidation after the introduction. Preferred compounds having at least one epoxy group and/or oxetanyl group and one hydroxyl group in its molecule include 2,3-epoxy-1-propanol, 3-ethyl-3-(hydroxymethyl)oxetane, and glycerin diglycidyl ether because these compounds are easily available.

The introduction by addition reaction of the hydrosilane compound can be conducted by either of the processes of: synthesizing an unsaturated group-terminated organic polymer and subsequently adding a monohydrosilane compound having an epoxy group and/or an oxetanyl group; adding a hydrosilane compound having at least two hydrosilyl groups in its molecule into an end of an organic polymer and subsequently adding an epoxy and/or oxetane compound having an unsaturated group, such as an allyl group, into an unreacted hydrosilyl group. Preferably, the former process is adopted from the viewpoint of ease of production, selectivity in reaction, and easy control of introduction quantity of the epoxy group and/or the oxetanyl group.

In order to obtain a polymer having a specific end structure in the present invention, a hydrosilane compound expressed by general formula (5) may be used.

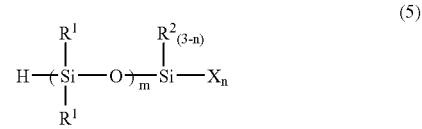

(5)

In the formula, $R^1$, $R^2$, X, m, and n are the same as in general formula (1).

In particular, it is preferable to use a hydrosilane compound expressed by general formula (6) from the viewpoint of high reactivity of the terminal epoxy group, and more preferable to use a hydrosilane compound expressed by general formula (7) or (8) from the viewpoint of ease of production, availability, and high reactivity.

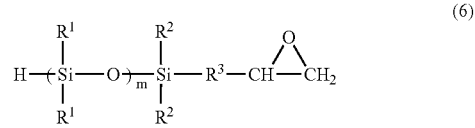

(6)

In this formula, $R^1$, $R^2$, $R^3$, and m are the same as above.

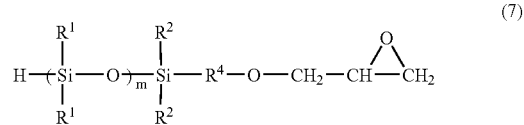

(7)

In this formula, $R^1$, $R^2$, $R^4$, and m are the same as above.

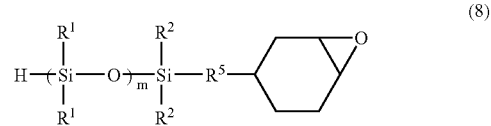

(8)

In this formula, $R^1$, $R^2$, $R^5$, and m are the same as above.

The hydrosilane compound can be synthesized by a known synthetic process. For synthesis, for example, a polysiloxane compound having hydrosilyl groups at its both ends is subjected to addition reaction with an epoxy compound having an unsaturated group by hydrosilylation, as described in Journal of Polymer Science Part A, Polymer Chemistry, Vol. 31, 2563–2572 (1993) or Vol. 31, 2729–2737 (1993).

In the hydrosilane compound, $R^1$ is more preferably methyl from the viewpoint of availability. Examples of such compounds are listed below while being listed in the foregoing literatures.

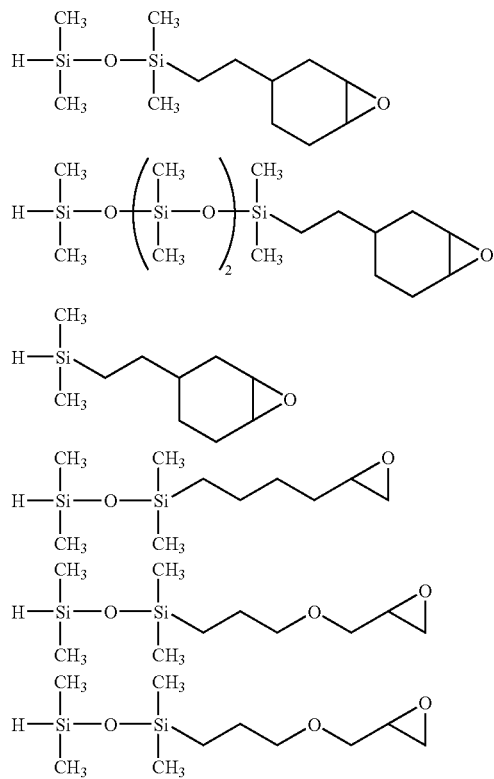

The unsaturated group-terminated organic polymer can be synthesized by a generally known process without problems. For example, a halogen-terminal polymer prepared by living cationic polymerization may be dehydrohalogenated with a metal alkoxide, or allyltrimethylsilane or the like may be allowed to react in the presence of titanium tetrachloride or the like to introduce an unsaturated group. Also, a compound having an unsaturated bond may be reacted with a hydroxy terminal to form an ether bond, ester bond, urethane bond, carbonate bond, or the like, thereby introducing an unsaturated group.

For example, in the formation of an unsaturated group-terminated polymer from a polymer having a hydroxy terminal, the hydroxy terminal is converted into an oxymetal group, such as —ONa or —OK, followed by reaction with an unsaturated group-containing organic compound expressed by general formula (9):

general formula (10):

(in the formulas, $R^7$ represents a divalent organic group having a carbon number in the range of 1 to 20, $R^8$ represents a hydrocarbon group having a carbon number of 10 or less, and Y represents a halogen atom).

To convert the hydroxy terminal into an oxymetal group, the terminal is reacted with, for example, an alkali metal, such as Na or K, a metal hydride, such as NaH, metal alkoxide, such as $NaOCH_3$, or an alkali hydroxide, such as NaOH or KOH.

Examples of the unsaturated group-containing compound expressed by general formula (9) or (10) include: $CH_2=CH-CH_2-Cl$, $CH_2=CH-CH_2-Br$, $CH_2=CH-C_2H_4-Cl$, $CH_2=CH-C_2H_4-Br$, $CH_2=CH-C_3H_6-Cl$, $CH_2=CH-C_3H_6-Br$, $CH_2=C(CH_3)-CH_2-Cl$, $CH_2=C(CH_3)-CH_2-Br$, $CH_2=C(CH_2CH_3)-CH_2-Cl$, $CH_2=C(CH_2CH_3)-CH_2-Br$, $CH_2=C(CH_2CH(CH_3)_2)-CH_2-Cl$, and $CH_2=C(CH_2CH(CH_3)_2)-CH_2-Br$. Among these, preferred are $CH_2=CH-CH_2-Cl$ and $CH_2=C(CH_3)-CH_2-Cl$, particularly from the viewpoint of reactivity.

The unsaturated group may be introduced by another process using an isocyanate compound, a carboxylic acid, an epoxy compound, or the like having a $CH_2=CH-CH_2-$ group, a $CH_2=C(CH_3)-CH_2-$ group, or the like.

The above-mentioned hydrosilylation is preferably performed by a reaction between an unsaturated group-terminated organic polymer and a hydrosilyl compound in the presence of a Group VIII transition metal catalyst.

An advantageous VIII transition metal catalyst is selected from metal complex catalysts containing Group VIII transition metal elements, such as platinum, rhodium, cobalt, palladium, and nickel. Examples of such a catalyst include $H_2PtCl_6 \cdot 6H_2O$, platinum-vinylsiloxane complexes, platinum-olefin complexes, Pt metal, $RhCl(PPh_3)_3$, $RhCl_3$, $Rh/Al_2O_3$, $RuCl_3$, $IrCl_3$, $FeCl_3$, $PdCl_2 \cdot 2H_2O$, and $NiCl_2$. Preferably, any one of $H_2PtCl_6 \cdot 6H_2O$, platinum-vinylsiloxane complexes, and platinum-olefin complexes is used from the viewpoint of hydrosilylation reactivity. Platinum-vinylsiloxane complexes are particularly preferable because the induction period of reaction is short.

In addition to these compounds, $AlCl_3$, $TiCl_4$, and benzoyl peroxide and other radical initiators may be used as the hydrosilylation catalyst.

The temperature of the hydrosilylation is selected from the viewpoint of reaction rate, provided such a side reaction as negatively affects the polymer does not easily occur. The temperature is generally in the range of 10 to 150° C., preferably 20 to 120° C., more preferably 40 to 100° C. For adjusting the reaction temperature or the viscosity of the reaction system, or for the reason of other necessity, a solvent may be used, such as benzene, toluene, xylene, tetrahydrofuran, methylene chloride, pentane, hexane, or heptane.

In order to accelerate the hydrosilylation, a process may be applied, such as reactivation of catalyst with oxygen, as disclosed in Japanese Unexamined Patent Application Publication No. 8-283339, or addition of sulfur.

In order to prevent oxidation of the organic polymer, the reaction solvent, the plasticizer in the system, and the like, the hydrosilylation may be performed in the presence of an antioxidant.

For the measurement of the percentage of introduction of the epoxy- and/or oxetanyl-containing silicon group, various methods can be applied. At present, the percentage can be accurately obtained by comparing the integral obtained from NMR spectra of the end into which the epoxy- and/or oxetanyl-containing silicon group is introduced to that of the end into which such groups are not introduced.

The process for producing a saturated hydrocarbon polymer having an epoxy- and/or oxetanyl-containing silicon group at its end will now be described in detail.

An isobutylene polymer having and epoxy group and/or an oxetanyl group at its end of the present invention may be produced with use of an end-functional, preferably all-end-functional, isobutylene polymer prepared by polymerization called the inifer process (cationic polymerization using a specific compound called an inifer, serving as an initiator and a chain transfer agent). For the introduction of an epoxy- and/or oxetanyl-containing silicon group into the polymer, for example, an unsaturated group-terminated polyisobutylene is prepared by dehalogenating the end-functional polymer or introducing an unsaturated group into a polymer as disclosed in Japanese Unexamined Patent Application Publication No. 63-105005, and then the polyisobutylene is subjected to addition reaction with the epoxy- and/or oxetanyl-containing hydrosilane compound expressed by general formula (6), (7), or (8) by hydrosilylation in the presence of a platinum catalyst.

As for hydrogenated polybutadiene polymer, for example, the hydroxy terminal of a hydroxyl-terminated hydrogenated polybutadiene polymer is converted into an oxymetal group, such as —ONa or —OK, followed by a reaction with an unsaturated group-containing compound expressed by general formula (9) or (10). Thus, an unsaturated group-terminated hydrogenated polybutadiene polymer can be obtained.

The product unsaturated group-terminated hydrogenated polybutadiene polymer has substantially the same molecular weight as the starting material hydroxyl-terminated hydrogenated polybutadiene polymer. For a polymer having a higher molecular weight, the starting material is first reacted with a polyvalent organic halogen compound containing at least two halogens, such as methylene chloride, bis(chloromethyl)benzene, or bis(chloromethyl)ether, in its molecule before the reaction with the organic halogen compound expressed by general formula (9) or (10), so that the molecular weight can be increased. Then, the product is reacted with the organic halogen compound expressed by general formula (9) or (10) to yield a higher molecular weight hydrogenated polybutadiene polymer having an olefin group at its end.

The introduction of the epoxy- and/or oxetanyl-containing silicon group into the unsaturated group-terminated hydrogenated polybutadiene polymer is performed by an addition reaction with a hydrosilane compound in the presence of a platinum catalyst, as in the case of isobutylene polymer.

Saturated hydrocarbon polymers containing substantially no unsaturated bond except aromatic rings provide coatings having superior weather resistance to coatings formed of known rubber polymers, such as unsaturated bond-containing organic polymers. Also, since such polymers are hydrocarbon polymers, they have low gas permeability and high water resistance, accordingly providing advantageously less gas-permeable coatings.

A process for preparing the oxyalkylene polymer having an epoxy and/or oxetanyl-containing silicon group at its end is not particularly limited. The oxyalkylene polymer is, for example, obtained by hydrosilylation of the above-described unsaturated group-terminated oxyalkylene polymer with the monohydrosilane compound having an epoxy- and/or oxetanyl-containing silicon group expressed by general formula (6), (7), or (8).

For the production of the unsaturated group-terminated oxyalkylene polymer, the following process can be applied. In, for example, the case of introducing an unsaturated group with an ether bond, the hydroxy terminal of an oxyalkylene polymer is converted into a metaloxy group —OM (M represents Na, K, or the like), and subsequently reacted with the unsaturated group-containing compound expressed by general formula (9) or (10), as above.

For the introduction of an epoxy group and/or an oxetanyl group into the polymer end by hydrolyzable group exchange reaction, a hydrolyzable silyl-terminated organic polymer is subjected to a hydrolyzable group exchange reaction with a compound having at least one epoxy and/or oxetanyl group and one hydroxyl group in its molecule.

The hydrolyzable silyl group of the hydrolyzable silyl-terminated organic polymer is not particularly limited, but is typically expressed by the groups expressed by general formula (11), for example:

$$—[SiR^1{}_2O]_mSi(R^2{}_{3-n})Z_n \qquad (11)$$

(In the formula, $R^1$, $R^2$, m, and n are the same as above. Z represents a hydroxyl group or a hydrolyzable group, and if the number of Zs is two or more, they may be the same or different.)

The hydrolyzable group expressed by Z is not particularly limited, and any known hydrolyzable group can be used. Exemplary hydrolyzable groups include the hydrogen atom, halogen atoms, and alkoxy, acyloxy, ketoximate, amino, amido, acid amido, aminoxy, mercapto, and alkenyloxy groups. Among these, preferred are alkoxy groups, such as methoxy, ethoxy, propoxy, and isopropoxy, from the viewpoint of gentle hydrolyzability and ease of handling.

If at least two of the hydrolyzable or hydroxyl groups are present in a reactive silicon group, they may be the same or different.

Preferably, the reactive silicon group is expressed by general formula (12) because of availability.

$$—Si(R^2{}_{3-n})Z_n \qquad (12)$$

(In the formula, $R^2$, Z and n are the same as above.) The process for producing the hydrolyzable silyl-terminated organic polymer is not particularly limited, and the unsaturated group-terminated organic polymer and a hydrosilane compound expressed by following general formula (13) may be subjected to the above-described addition reaction.

$$H—[SiR^1{}_2]_mSi(R^2{}_{3-n})Z_n \qquad (13)$$

(In the formula, $R^1$, $R^2$, Z, m, and n are the same as above.)

In particular, from the viewpoint of availability, the hydrosilane compound is preferably expressed by general formula (14):

$$H—Si(R^2{}_{3-n})Z_n \qquad (14)$$

(In the formula, $R^2$, Z, m and n are the same as above.)

Examples of the compound expressed by general formulas (13) and (14) include silane halides, such as trichlorosilane, methyldichlorosilane, dimethylchlorosilane, phenyldichlorosilane, trimethylsiloxymethylchlorosilane, and 1,1,3,3-tetramethyl-1-bromodisiloxane; alkoxysilanes, such as trimethoxysilane, triethoxysilane, methyldiethoxysilane, methyldimethoxysilane, phenyldimethoxysilane, trimethylsiloxymethylmethoxysilane, and trimethylsiloxydiethoxysilane; acyloxysilanes, such as methyldiacetoxysilane, phenyldiacetoxysilane, triacetoxysilane, trimethylsiloxymethylacetoxysilane, and trimethylsiloxydiacetoxysilane; ketoxime silanes, such as bis(dimethylketoximate)methylsilane, bis(cyclohexylketoximate)methylsilane, bis(diethylketoximate)trimethylsiloxysilane, bis(methylethylketoximate)methylsilane, and tris(acetoximate)silane; and alkenyloxysilanes, such as methylisopropenyloxysilane. Among these, preferred are alkoxysilanes. Particularly preferred alkoxy groups include methoxy, ethoxy, propoxy, and isopropoxy groups.

The compound having at least one epoxy and/or oxetanyl group and one hydroxyl group in its molecule to be reacted with the above-described hydrolyzable silyl-terminated organic polymer is not particularly limited, but is preferably a secondary or primary compound having a hydroxyl group from the viewpoint of reactivity.

Examples of the compound having at least one epoxy and/or oxetanyl group and one hydroxyl group in its molecule are expressed by general formula (15).

$$W-OH \qquad (15)$$

(W represents a monovalent organic group having an epoxy group and/or an oxetanyl group.)

Examples of such compounds include 2,3-epoxy-1-propanol, 3-ethyl-3-hydroxymethyloxetane, and glycerin diglycidyl ether, from the viewpoint of availability. Among these, preferred are 2,3-epoxy-1-propanol and 3-ethyl-3-hydroxymethyloxetane, which are primary alcohols.

The quantity of the compound is not particularly limited. However, in order to promote the exchange reaction, at least 1 mole equivalent of the compound is used relative to the hydrolyzable group of the hydrolyzable silyl-terminated organic polymer.

The exchange reaction of the hydrolyzable group can be performed by a reaction between the above-described hydrolyzable silyl-terminated organic polymer and the above-described compound having at least one epoxy and/or oxetanyl group and one hydroxyl group in its molecule in the presence of a transesterification catalyst.

Examples of the transesterification catalyst include alkali metal alkoxides, Sn compounds, Ti compounds, Zn compounds, Ba compounds, and conventionally used highly alkaline compounds. Suitable transesterification catalysts include dimethyltin neodecanoate, dibutyltin diacetate, dibutyltin dilaurate, dioctyltin dilaurate, dibutyltin dioctate, zinc naphthenate, cobalt naphthenate, zinc octylate, tin octylate, cobalt octylate, diisooctyl mercaptoacetate, zirconium naphthenate, zirconium octylate, tetrabutyl titanate, tetraisopropyl titanate, barium hydroxide monohydrate, and other organic metal catalysts. In particular, the transesterification catalyst is preferably selected from among tetraisopropyl titanate, barium hydroxide monohydrate, and alkoxides, such as sodium methoxide.

The quantity of the transesterification catalyst to be used is not particularly limited, but is generally in the range of 50 to 100,000 ppm, and preferably 50 to 3,000 relative to the organic polymer.

In the transesterification, a solvent may be further used. Examples of the solvent include, but not particularly limited to, aliphatic hydrocarbons, such as pentane, cyclopentane, hexane, cyclohexane, heptane, octane, and nonane; aromatic hydrocarbons, such as benzene, toluene, and xylene; and fluorine-, chlorine-, or bromine-substituted aliphatic or aromatic hydrocarbons, such as perchloroethylene and bromobenzene. At least two nonpolar solvents may be used in combination.

The quantity of the solvent is not limited, but 100 parts by weight of the polymer may contain 0 to 100 parts by weight of the solvent.

The transesterification can be promoted by devolatilization of the product. For devolatilization, known processes in the art can be applied. Any devolatilization process may be adopted in the present invention. For example, the devolatilization is performed by heating, heating and decompression, using a rotatory evaporator, a thin-film stripper, or a wiped film evaporator, or a combination of these methods. Preferably, the devolatilization is performed by heating the product to a temperature of 50 to 150° C. under a reduced pressure of about 20 to 100 Torr.

The organic polymer having at its end an epoxy- and/or oxetanyl-containing silicon group of the present invention is a novel polymer prepared by introducing an epoxy- and/or oxetanyl-containing silicon group selectively into its end, and can be synthesized in a production process preventing degradation of its main chain and other adverse effects. The resulting polymer can be cured independently by a known reaction of the epoxy group and/or the oxetanyl group, and can be used for modification of conventionally used epoxy cured product. These cured products are expected to exhibit characteristics derived from the main chain of the polymer.

The organic polymer having at its end an epoxy- and/or oxetanyl-containing silicon group of the present invention can be cured by, but not particularly limited to, reacting the epoxy group and/or the oxetanyl group with a common curing agent for epoxy- and/or oxetanyl-containing compounds. Examples of the curing agent include amine-based curing agents, acid-based curing agents, boron trifluoride-amine complex curing agents, and photo-cation curing agents. These agents can be used in common processes.

In particular, a photo-curing reaction is preferably adopted because it allows short-time curing. For the photo-curing reaction, a cationic photo-initiator may be used. Suitable cationic photo-initiators include onium salts, diaryliodonium sulfonates, triarylsulfonium sulfonates, diaryliodonium boronates, triarylsulfonium boronates, and photo-initiators disclosed in Japanese Unexamined Patent Application Publication Nos. 5-117311, 11-49791, or 2000-226396.

The organic polymer having at its end an epoxy- and/or oxetanyl-containing silicon group of the present invention may contain another polymer, a filler, a reinforcer, other additives, and a catalyst, if necessary, so that the resulting polymer can be advantageously used as adhesive, paint, sealant compositions, waterproofing material, spraying material, molding material, and injection rubber.

Best Mode for Carrying Out the Invention

The present invention will be further described in detail with reference to examples, but the invention is not limited by the examples.

EXAMPLE 1

Synthesis of Allyl-Terminated Isobutylene Polymer

A 2 L pressure-resistant glass vessel was equipped with a three-way stopcock and purged with nitrogen. Into the vessel were added, with a syringe, 138 mL of ethylcyclohexane (dried by being allowed to stand at least overnight together with molecular sieve 3A), 1,012 mL of toluene (dried by being allowed to stand at least overnight together with molecular sieve 3A), and 8.14 g (35.2 mmol) of 1,4-bis(α-chloroisopropyl)benzene.

A pressure-resistant glass liquefied sampling tube equipped with a needle valve, containing 254 mL (2.99 mol) of isobutylene monomer was joined to the three-way stopcock. Then, the polymerization vessel was cooled in a dry ice/ethanol bath of −70° C., and subsequently depressurized with a vacuum pump. After introducing the isobutylene monomer into the polymerization vessel from the liquefied gas sampling tube with the needle valve open, nitrogen was introduced into the vessel through one way of the three-way stopcock, and thus the pressure in the vessel was increased to normal pressure. Then, 0.387 g (4.15 mmol) of 2-methylpyridine was added. Subsequently, 4.90 mL (44.7 mmol) of titanium tetrachloride was added to initiate polymerization. After a reaction time of 70 minutes, 9.65 g (13.4 mmol) of allyltrimethylsilane was added to introduce an allyl group into an end of the polymer. After a reaction time of 120 minutes, the reaction solution was washed with 200 mL of water four times, and the solvent was evaporated to yield an allyl-terminated isobutylene polymer.

The yield of the product polymer was calculated, and the Mn and the Mw/Mn was determined by GPC. The end structure was determined by 300 MHz $^1$H-NMR in which the intensities of resonance signals of protons from the constituent structures (protons of the starting material: 6.5 to 7.5 ppm; peaks of terminal allyl groups of the polymer (4.97 ppm: =CH$_2$, 5.79 ppm: —CH=C) were measured and compared. The $^1$H—NMR analysis was performed in carbon tetrachloride/heavy acetone with Varian Gemini 300 (300 MHz for $^1$H).

The GPC was performed with a liquid delivery system Waters LC Module 1 and a column Shodex K-804. The molecular weight was defined as a relative molecular weight to a polystyrene standard. The results of polymer analysis were: Mn =5,800; Mw/Mn =1.35; and Fn(v) =2.04 (number of allyl groups per molecule of an aromatic ring being the residue of the starting material).

(Introduction of epoxy-containing silicon group into polymer terminal)

A 300 mL three-neck flask was charged with 100 g of the allyl-terminated polyisobutylene polymer and 2 g of toluene, and equipped with a stirrer having a vacuum seal, a three-way stopcock, and a ball cock. The reaction system was heated to 180° C. and stirred, and the water and hydrochloric acid in the reaction system were removed with a vacuum pump for two hours.

After cooling the reaction system to 100° C., 0.05 g of 3,5-di-tert-butyl-4-hydroxytoluene, 21.6 µL of platinum-1,1,3,3-tetramethyl-1,3-divinyldisiloxane complex (3% by weight solution in toluene, in terms of platinum), and 11.1 µL of 1% sulfur solution in toluene were dripped, and the mixture was sufficiently stirred.

Into the reaction mixture was slowly dripped, from a dripping tube, 9.13 g of an epoxy group-containing monohydrosilane having the following structure prepared by a reaction of an allyl glycidyl ether with tetramethyldisiloxane. The mixture was stirred for 2 hours in air containing 6% of oxygen.

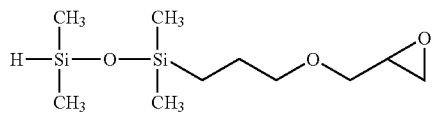

The progress of the reaction was monitored by $^1$H-NMR, and confirmed by reduction or disappearance of the peak heights of terminal allyl groups (4.97 ppm:=CH$_2$, 5.79 ppm: —CH=C) and reduction of the peak height of the hydrosilyl group (Si—H, 4.65 ppm) of the dripped epoxy group-containing monohydrosilane.

The $^1$H-NMR analysis of the reaction product showed that the peaks of the above-mentioned allyl groups of the original allyl-terminated polymer and hydrosilane completely disappeared. Thus, it was confirmed that an isobutylene polymer having at a desired end an epoxy-containing silicon group expressed by the following formula was obtained:

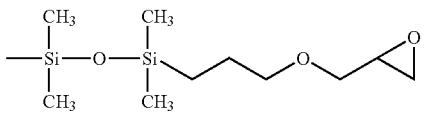

EXAMPLE 2

Synthesis of Allyl-terminated Oxypropylene Polymer

A starting material polypropylene glycol having a number average molecular weight of 2,000 was polymerized with propylene oxide in the presence of a zinc hexacyanocobaltate-glyme complex catalyst to yield a polypropylene glycol having a number average molecular weight of 10,000. Then, CH$_3$ONa (solution in methanol) was added in an amount of 1.2 equivalents per terminal hydroxyl group of the resulting polypropylene glycol, and the terminal was converted into a metaloxy group while the methanol was removed under reduced pressure. Into the reaction system, 1.3 equivalents of 3-chloro-1-propene was added. After a reaction, byproduct salts were removed by demineralization to yield an allyl-terminated oxypropylene polymer.

(Introduction of Epoxy-containing Silicon Group into Polymer Terminal)

A 300 mL three-neck flask was charged with 100 g of the allyl-terminated oxypropylene polymer and 2 g of hexane, and equipped with a stirrer having a vacuum seal, a three-way stopcock, and a ball cock. The reaction system was heated to 90° C. and stirred, and the water in the reaction system was removed with a vacuum pump for two hours by azeotropic dehydration.

Then, 4.10 µL of platinum-1,1,3,3-tetramethyl-1,3-divinyldisiloxane complex (3% by weight solution in toluene, in terms of platinum) was dripped, and the mixture was sufficiently stirred. Into the reaction system, 4.52 g of the same epoxy group-containing monohydrosilane as in Example 1 was slowly dripped in an atmosphere of nitrogen, and the mixture was stirred for 2 hours.

The progress of the reaction was monitored by $^1$H-NMR, and confirmed by reduction or disappearance of the peak heights of terminal allyl groups (4.97 ppm: =CH$_2$, 5.79 ppm: —CH=C) and reduction of the peak height of the hydrosilyl group (Si—H, 4.65 ppm) of the dripped epoxy group-containing monohydrosilane.

The $^1$H-NMR analysis of the reaction product showed that the peaks of the above-mentioned allyl groups of the original allyl-terminated polymer and hydrosilane completely disappeared. Thus, it was confirmed that an oxyalkylene polymer having at its end an epoxy-containing silicon group expressed by the following formula was obtained:

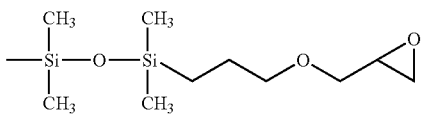

EXAMPLE 3

A 300 mL three-neck flask was charged with 100 g of the allyl-terminated polyisobutylene polymer and 2 g of toluene, and equipped with a stirrer having a vacuum seal, a three-way stopcock, and a ball cock. The reaction system was heated to 180° C. and stirred, and the water and hydrochloric acid in the reaction system were removed with a vacuum pump for two hours.

After cooling the reaction system to 100° C., 0.05 g of 3,5-di-tert-butyl-4-hydroxytoluene, 21.6 μL of platinum-1, 1,3,3-tetramethyl-1,3-divinyldisiloxane complex (3% by weight solution in toluene, in terms of platinum), and 11.1 μL of 1% sulfur solution in toluene were dripped, and the mixture was sufficiently stirred.

Into the reaction mixture was slowly dripped, from a dripping tube, 9.50 g of an epoxy group-containing monohydrosilane having the following structure prepared by a reaction of 1,2-epoxy-4-vinylcyclohexane with tetramethyldisiloxane. The mixture was stirred for 2 hours in air containing 6% of oxygen.

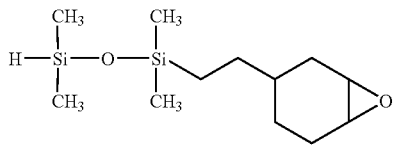

The progress of the reaction was monitored by $^1$H-NMR, and confirmed by reduction or disappearance of the peak heights of terminal allyl groups (4.97 ppm: =CH$_2$, 5.79 ppm: —CH=C) and reduction of the peak height of the hydrosilyl group (Si—H, 4.65 ppm) of the dripped epoxy group-containing monohydrosilane.

The $^1$H-NMR analysis of the reaction product showed that the peaks of the above-mentioned allyl groups of the original allyl-terminated polymer and hydrosilane completely disappeared. Thus, it was confirmed that an isobutylene polymer having at a desired end an epoxy-containing silicon group expressed by the following formula was obtained:

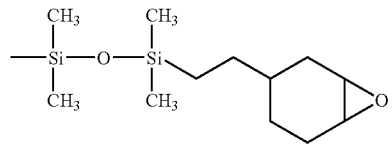

EXAMPLE 4

Synthesis of Hydrolyzable Silyl Group-containing Polymer

A 300 mL three-neck flask was charged with 100 g of the allyl-terminated polyisobutylene polymer and 2 g of toluene, and equipped with a stirrer having a vacuum seal, a three-way stopcock, and a ball cock. The reaction system was heated to 180° C. and stirred, and the water and hydrochloric acid in the reaction system were removed with a vacuum pump for two hours.

After cooling the reaction system to 100° C., 0.05 g of 3,5-di-tert-butyl-4-hydroxytoluene, 21.6 μL of platinum-1, 1,3,3-tetramethyl-1,3-divinyldisiloxane complex (3% by weight solution in toluene, in terms of platinum), and 11.1 μL of 1% sulfur solution in toluene were dripped,-and the mixture was sufficiently stirred.

Into the reaction system, 5.86 g of methyldimethoxysilane was slowly dripped from a dripping tube, and the mixture was stirred for 2 hours in air containing 6% of oxygen. Then, excess methyldimethoxysilane was removed under reduced pressure to yield an isobutylene polymer having at its end a hydrolyzable group having the following structure:

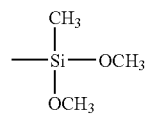

(Hydrolyzable Group Exchange Reaction)

A 500 mL flask equipped with a Dean-Stark separator was charged with 100 g of the alkoxysilyl-terminated polyisobutylene polymer and 100 g of toluene. Subsequently, 14.4 g of 3-ethyl-3-hydroxymethyloxetane and 200 μL of tetraisopropoxy titanate were added. The mixture was heated to 70° C. to react for 16 hours while being stirred. After the reaction, toluene and excess 3-ethyl-3-hydroxymethyloxetane were removed under reduced pressure.

The progress of the reaction was monitored by $^1$H-NMR, and confirmed by reduction or disappearance of the peak height of the terminal methoxy group (3.5 ppm: —CH$_3$).

The $^1$H-NMR analysis of the reaction product showed that the average number of introduced terminal 3-ethyl-3-hydroxymethyloxetanyl groups was 1.5. Thus, it was confirmed that an isobutylene polymer having at a desired end an oxetanyl-containing silicon group expressed by the following formula was obtained:

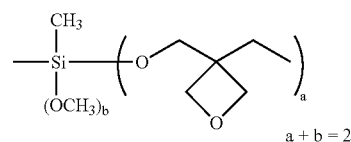

INDUSTRIAL APPLICABILITY

The present invention provides polymers prepared by selectively and quantitatively introducing epoxy- and/or oxetanyl-containing silicon groups into ends of various types of organic polymer, and a simple process for producing the polymers which prevents the introduction of the epoxy groups from oxidizing or negatively affecting the polymers and which does not require purification and other steps in association with generation of byproducts.

The resulting organic polymer having an epoxy- and/or oxetanyl-containing silicon group at its end has superior reactivity, and its cured product and known cured products modified with the organic polymer can exhibit the characteristics of the main chain skeleton of the polymer. Thus, the organic polymer of the present invention can be advantageously used in various industrial applications.

What is claimed is:

1. An organic polymer having an end structure expressed by general formula (1):

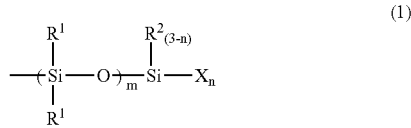

(wherein $R^1$ represents an alkyl group having a carbon number in the range of 1 to 20, an aryl group having a carbon number in the range of 6 to 20, an aralkyl group having a carbon number in the range of 7 to 20, or a triorganosiloxy group expressed by $(R')_3SiO-$; $R^2$ represents an alkyl group having a carbon number in the range of 1 to 20, an aryl group having a carbon number in the range of 6 to 20, an aralkyl group having a carbon number in the range of 7 to 20, an alkoxy group having a carbon number in the range of 1 to 20, or a triorganosiloxy group expressed by $(R')_3SiO-$; if the number of $R^1$s or $R^2$s is at least two, they may be the same or different; R' represents a monovalent hydrocarbon group having a carbon number in the range of 1 to 20 and the three R's may be the same or different; X represents a monovalent organic group having an epoxy group and/or an oxetanyl group, and if the number of Xs is at least two, they may be the same or different; m represents an integer in the range of 0 to 20; and n represents an integer of 1, 2, or 3), and wherein the main chain skeleton of the organic polymer comprises a saturated hydrocarbon polymer selected from the group consisting of polyisobutylene, hydrogenated polyisoprene, hydrogenated polybutadiene, and copolymers thereof.

2. An organic polymer having an end structure expressed by general formula (2):

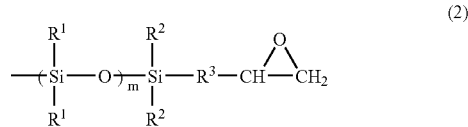

(wherein $R^1$ represents an alkyl group having a carbon number in the range of 1 to 20, an aryl group having a carbon number in the range of 6 to 20, an aralkyl group having a carbon number in the range of 7 to 20, or a triorganosiloxy group expressed by $(R')_3SiO-$; $R^2$ represents an alkyl group having a carbon number in the range of 1 to 20, an aryl group having a carbon number in the range of 6 to 20, an aralkyl group having a carbon number in the range of 7 to 20, an alkoxy group having a carbon number in the range of 1 to 20, or a triorganosiloxy group expressed by $(R')_3SiO-$; if the number of $R^1$s or $R^2$s is at least two, they may be the same or different; R' represents a monovalent hydrocarbon group having a carbon number in the range of 1 to 20 and the three R's may be the same or different; $R^3$ represents a divalent organic group having a carbon number in the range of 1 to 20 and containing at least one constituent atom selected from the group consisting of hydrogen, oxygen, and nitrogen; and m represents an integer in the range of 0 to 20), and wherein the main chain skeleton of the organic polymer comprises a saturated hydrocarbon polymer selected from the group consisting of polyisobutylene, hydrogenated polyisoprene, hydrogenated polybutadiene, and copolymers thereof.

3. An organic polymer having an end structure expressed by general formula (3):

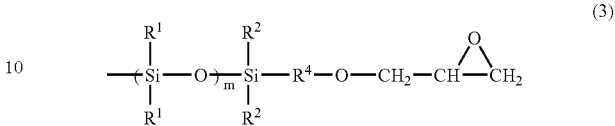

(wherein $R^1$ represents an alkyl group having a carbon number in the range of 1 to 20, an aryl group having a carbon number in the range of 6 to 20, an aralkyl group having a carbon number in the range of 7 to 20, or a triorganosiloxy group expressed by $(R')_3SiO-$; $R^2$ represents an alkyl group having a carbon number in the range of 1 to 20, an aryl group having a carbon number in the range of 6 to 20, an aralkyl group having a carbon number in the range of 7 to 20, an alkoxy group having a carbon number in the range of 1 to 20, or a triorganosiloxy group expressed by $(R')_3SiO-$; if the number of $R^1$s or $R^2$s is at least two, they may be the same or different; R' represents a monovalent hydrocarbon group having a carbon number in the range of 1 to 20 and the three R's may be the same or different; $R^4$ represents a divalent organic group having a carbon number in the range of 1 to 20 and containing at least one constituent atom selected from the group consisting of hydrogen, oxygen, and nitrogen; and m represents an integer in the range of 0 to 20), and wherein the main chain skeleton of the organic polymer comprises a saturated hydrocarbon polymer selected from the group consisting of polyisobutylene, hydrogenated polyisoprene, hydrogenated polybutadiene, and copolymers thereof.

4. An organic polymer having an end structure expressed by general formula (4):

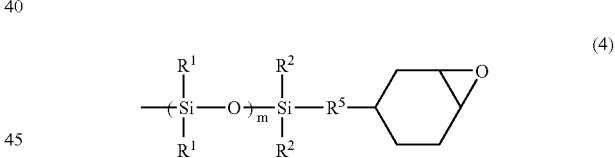

(wherein $R^1$ represents an alkyl group having a carbon number in the range of 1 to 20, an aryl group having a carbon number in the range of 6 to 20, an aralkyl group having a carbon number in the range of 7 to 20, or a triorganosiloxy group expressed by $(R')_3SiO-$; $R^2$ represents an alkyl group having a carbon number in the range of 1 to 20, an aryl group having a carbon number in the range of 6 to 20, an aralkyl group having a carbon number in the range of 7 to 20, an alkoxy group having a carbon number in the range of 1 to 20, or a triorganosiloxy group expressed by $(R')_3SiO-$; if the number of $R^1$s or $R^2$s is at least two, they may be the same or different; R' represents a monovalent hydrocarbon group having a carbon number in the range of 1 to 20 and the three R's may be the same or different; $R^5$ represents a divalent organic group having a carbon number in the range of 1 to 20 and containing at least one constituent atom selected from the group consisting of hydrogen, oxygen, and nitrogen; and m represents an integer in the range of 0 to 20), and wherein the main chain skeleton of the organic polymer comprises a saturated hydrocarbon polymer selected from the group consisting of polyisobutylene, hydrogenated polyisoprene, hydrogenated polybutadiene, and copolymers thereof.

5. The organic polymer according to claim 1, wherein at least one X has a structure expressed by the following formula:

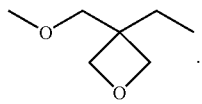

6. The organic polymer according to claim 1, wherein at least one X has a structure expressed by the following formula:

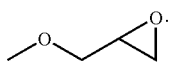

7. The organic polymer according to claim 1, wherein the organic polymer is produced by an addition reaction of an organic polymer having an unsaturated group at an end thereof with a hydrosilane compound having an epoxy group and/or an oxetanyl group.

8. A process for producing the organic polymer as set forth in claim 1, the process comprising the step of performing an addition reaction of an organic polymer having an unsaturated group at an end thereof with a hydrosilane compound having an epoxy group and/or an oxetanyl group.

9. The organic polymer according to claim 1, wherein the organic polymer is produced by an exchange reaction of a hydrolyzable group between an organic polymer having a hydrolyzable silyl group at an end thereof and a compound having at least one epoxy and/or oxetanyl group and one hydroxyl group in one molecule thereof.

10. A process for producing the organic polymer as set forth in claim 1, the process comprising the step of performing an exchange reaction of a hydrolyzable group between an organic polymer having a hydrolyzable silyl group at an end thereof and a compound having at least one epoxy and/or oxetanyl group and one hydroxyl group in one molecule thereof.

* * * * *